United States Patent [19]

Eshbach et al.

[11] 4,303,716

[45] Dec. 1, 1981

[54] DECORATIVE SURFACE ARTICLES

[75] Inventors: John R. Eshbach; Richard E. Felter; Thomas Posipanko, all of Lancaster, Pa.

[73] Assignee: Armstrong World Industries, Lancaster, Pa.

[21] Appl. No.: 206,766

[22] Filed: Nov. 14, 1980

[51] Int. Cl.[3] .......................... B32B 27/12; B32B 3/26

[52] U.S. Cl. .................................... 428/188; 156/229; 156/277; 156/298; 156/303.1; 264/138; 264/257; 264/277; 264/288.4; 428/292; 428/293; 428/294; 428/295; 428/392; 428/395; 428/913

[58] Field of Search ................. 428/67, 290, 292, 293, 428/294, 295, 375, 395, 187, 166, 188, 178, 46, 113, 114, 913; 264/271, 258, 288.4, 257, 138, 231; 156/298, 303.1, 229, 277

[56] References Cited

U.S. PATENT DOCUMENTS

| | | | |
|---|---|---|---|
| 2,176,837 | 10/1939 | Ellis | 428/442 |
| 2,775,994 | 1/1957 | Rowe | 156/298 |
| 2,782,130 | 2/1957 | Ness et al. | 117/38 |
| 3,014,263 | 12/1961 | Oace | 28/72 |
| 3,179,552 | 4/1965 | Hauser et al. | 161/143 |
| 3,305,429 | 2/1967 | Stadden | 161/169 |
| 3,949,127 | 4/1976 | Ostermeier et al. | 428/137 |
| 4,113,908 | 9/1978 | Shinomura et al. | 428/330 |
| 4,154,885 | 5/1979 | Tecl et al. | 428/198 |

*Primary Examiner*—Paul J. Thibodeau

[57] ABSTRACT

An article which has utility as a decorative surface for materials such as resilient flooring, furniture, walls, ceilings, counter tops and the like is produced by aligning and embedding a plurality of fibers in a translucent binder, curing the binder and thereafter subjecting the binder to tension which is applied in such a manner to thereby create aligned air pockets along the surface of at least some of the fibers. The article, thus produced, is typically in the form of a film, sheet, or board.

13 Claims, No Drawings

DECORATIVE SURFACE ARTICLES

BACKGROUND OF THE INVENTION

This invention relates generally to decorative surface articles which possess unique visual qualities and which can be of particular use in the resilient floor and furniture industries and to methods of producing such decorative surface articles.

Surface coverings, and in particular resilient floorings, are selected by the consumer largely on the basis of appearance, durability, each of maintenance and cost. Consumers have, in recent times, been bypassing the use of finished wood floors in favor of resilient synthetic floors for economic reasons and for ease of maintenance. However, because of the beauty of a finished wood floor, many efforts have been made to simulate many of wood's unique and desired visual qualities on resilient flooring. For example, one well-known method of producing simulated wood grain is to reproduce photographically a wood grain pattern and apply it to a suitable base surface. Other well-known methods include applying a wood grain pattern by printing or engraving means, such as hot stamping foils and roll and rotogravure printing or by heat transfer means. However, such surface coverings invariably appear even on a casual glance, as being a wood simulation, and furthermore, do not possess many of wood's unique and desired visual effects. Such visual effects are caused primarily by real wood's physical structure and surface qualities and cannot be redproduced by printing or photographic means alone. In particular, many finished wood products have visual qualities that change, in reference to the viewer, with the angle of incident light on the surface of the article. This visual effect, which is sometimes known as directional flip, may be noted by the transformation of the area viewed from light to dark shades and vice versa as the angle of incident illumination and/or the angle of view are changed. In addition to the above visual effect, it would be desirable to produce synthetic surfaces that have a sheen or luster and, even on smooth surfaces, a non-surface texture three dimensional effect. These effects are difficult, if not impossible, to duplicate in a printed or photographically reproduced pattern.

It is an object of the present invention to provide decorative surface articles that contain, in whole or part, many of the visual properties set forth above which can be employed on flooring, furniture, countertop surfacing products and the like and which are produced through the use of nonwood materials.

This and other objects as set forth herein have been surprisingly accomplished in an effective manner through the incorporation, in at least a portion of a decorative surface, of aligned air pockets or cavities which are positioned along the surface of fibers embedding within the decorative surface. These aligned air pockets simulate the reflective light scattering qualities of wood's fibrous lumen and give the resulting product directional flip. Through the use of such aligned air pockets or cavities, there is provided a unique, aesthetically attractive, functional resilient article which can be employed, for example, as a floor covering material and which has many of the unique visual properties that are set forth above.

SUMMARY OF THE INVENTION

The decorative surface articles [hereinafter article(s)] of the present invention are produced by aligning and embedding a plurality of non-hollow fibers in a flexible translucent binder or medium. The fibers are aligned in a single layer in a unidirectional, as opposed to a random orientation. The binder is then cured and is thereafter subjected to enough tension or pressure which is applied in such a manner to thereby create unidirectionally aligned air pockets or cavities which are individually positioned between the fiber's surface and the binder. Preferably, the tension or pressure is applied perpendicular to the horizontal axes of the fibers. In order to achieve the most varied visual effects, such horizontally-applied pressure is applied to only selected areas of the binder, to thereby create the aligned air pockets adjacent to the surface of those fibers that are directly beneath the area where the pressure is applied.

The article thus formed is a solid translucent substrate having an inner and outer surface and will generally be in the form of a film, sheet or board. The article may be utilized without modification. Alternatively, a decorative pattern may be applied to either surface of the article. The articles of the present invention are applied to the surface to be covered by, for example, heat-pressure transfer or via the use of a standard adhesive.

DETAILED DESCRIPTION OF THE INVENTION

Fibers suitable for use in this invention can be made from inorganic materials such as glass, quartz, and polymers such as polyesters, polypropylene, polyvinyl alcohol, polyamides (such as nylon) and the like. For the best visual effects, the fibers should be constructed of a colorless, translucent material that has a light refractive index (relative to air) close to or identical with the light refractive index of the binder. Ideally, the embedded fibers should be almost invisible in the binder. The term "fiber" is used herein to indicate both individual fibers and fiber yarn. Suitable fibers are available commercially, such as, for example, DuPont's Antron which is a fiber yarn made from nylon 66, a condensation product of adipic acid and hexamethylenadiamine, and DuPont's Dacron 774 and 772, which are polyester fibers.

The individual fibers utilized in the present invention are solid. The fibers and fiber yarn will have standard shapes. That is, in cross section they may be, for example, circular, trilobal, tetralobal, oval, generally rectangular with rounded corners, or other shapes in which such fiber and fiber yarn are commonly prepared. The diameter of the fibers will preferably range from about 0.5 mil to about 125 mils. The minimum length of the fibers should be about 10 mil, as it is difficult to properly align shorter fibers. The maximum length of the fiber is not critical; in fact, they can be "continuous," i.e., run the length of the finished article or be a single strand throughout the article.

The binder or medium in which the fibers are embedded should be comprised of a material at least sufficiently translucent so that light will pass freely through the binder and there will be no interference with the light scattering properties of the aligned hollow voids or cavities. Thus, it is understood that the term "translucent" encompasses transparent and semi-transparent materials which are also suitable for use as a medium in which the fibers are embedded. For best results, the refractive index of the medium should range from about 1.4 to about 1.6, relative to the refractive index of air. The medium is comprised of flowable thermoplastic materials such as, for example, plasticized polyvinyl chloride resins, copolymers of vinyl chloride and vinyl acetate or polyvinylidene chloride, and polyolefins, such as polyethylene and polypropylene, and polyurethane resins which, when cured, provide a flexible binder.

In the preferred process of this invention, fibers as described above are first deployed in a unidirectional orientation within the body of the matrix. The fibers should generally lie sufficiently close to the surface of the matrix so that the light scattering properties of the aligned hollow voids which are located contiguous with the fibers are apparent.

For best results, the fibers are preferably employed in a concentration of from about 0.25 g to about 50 g per square ft. of the outer surface of the surface covering article. The optimum concentration to be employed is dependent on variables such as the degree of transparency of the binder and the visual effect desired by the individual practitioner of the invention.

The preferred method of creating the aligned air pockets within the binder is, once the binder is cured, to apply, at a direction perpendicular to the horizontal axes of the fibers, a sufficient amount of tension or pressure to the binder to pull the binder apart from the fibers which are directly beneath where the pressure is applied, and thereby create generally tubular air pockets along at least part of the surface area of the fibers that are in contact with the binder, i.e., between the binder and the fibers. A preferred method of applying the tension or pressure is to apply it at a direction perpendicular to the horizontal axis of the fibers.

A particularly preferred method of applying pressure to the binder utilizes an embossing plate employed using sufficient pressure to thereby produce the aligned air pockets in areas only where the effect is desired. The unique feature realized using this preferred method is that the article will be translucent in specified areas and in the embossed areas will have the desired visual qualities discussed above, thereby greatly increasing the number of potential visual effects that are available to the practitioner of this invention. If a flat, smooth article is desired, the embossed areas may then be pressed flat. In such an operation, care should be taken to not apply more pressure in this flattening step than is employed in the embossing step, since excess pressure in this second step may serve to close some of the aligned air pockets which were created in the embossing step.

In another method of creating the aligned hollow voids, the fibers are surface coated with a small amount of a blowing agent, such as an azo-bis formamide, prior to being embedded in the matrix. The blowing agent can be triggered at elevated temperatures either during the binder curing step or after the binder is cured. The gas produced by the blowing agent produces a tubular void along the horizontal axes of the fibers.

If desired, a decorative pattern may be applied to the article in a number of ways, either before or after the production of the aligned hollow voids. For example, direct printing or heat transfer techniques which are well-known in the art may be employed. Alternatively, the decorative pattern may be applied to one surface of a thin, transparent protective or wear layer which can then be applied by pressure and heat to the outer surface of the article. In such applications, the pressure used to apply the protective layer to the article should be not more than the pressure required to create the air pockets along the surface of the solid fibers. The thin protective or wear layer may be a poly (vinyl chloride) film.

As used herein in reference to the article of the present invention, the terms "inner surface" and "inner side" both refer to the surface of the article that, when applied, is closest to the material being covered. The terms "outer surface" and "outer side" both refer to the surface of the article that is furthest from the material being covered. When a decorative pattern is applied to the outer side of the article, such a pattern will be semi-transparent to the degree that it will not obscure the unique visual effects, such as the light scattering qualities, of the aligned hollow voids.

In another embodiment of this invention, the decorative pattern can be applied directly to the material being covered, whereafter the surface covering article of the invention is applied on top of the decorative pattern. If desired, a complementary decorative pattern may then be applied to the outer side of the surface covering article.

EXAMPLE 1

A DuPont Antron yarn was wound around a 9"×9" metal plate such that the yarns were aligned in parallel. The yarn was applied at approximately 12 yarns per inch width and one layer thick. The yarn was comprised of 83 fibers of 15 dpf which were made from nylon 66. The fibers had a trilobal cross section and were continuous. A vinyl plastisol binder was applied to the yarn wrapped plate such that the yarn was sufficiently coated to form a smooth sheet after curing. The binder was cured by pressing at 325° F. and 100 psi for one minute. Keeping the temperature constant, the pressure was increased to 800 psi for three minutes, after which the sample was cured. The resulting smooth, near transparent article was, after being cut away from the plate, 23 mils thick. The article was pressed with an embossing plate with a tile grout line pattern at 150° F. and 1,000 psi for 1 minute and thereafter cooled. It was discovered that air pockets were present along the fiber surfaces directly beneath those areas in which the pattern was embossed. The embossed article was placed on a consolidated stencil vinyl substrate and pressed at 200 psi for one minute at temperatures of 275° F. bottom platen and 175° F. top platen. The article was cooled and the resulting product displayed three dimensionality, and directional flip in the embossed areas and was transparent in the non-embossed areas. The article was smooth and flat to the touch and sight.

EXAMPLE 2

A multi-filament glass yarn was wound onto a flat 9"×9" metal plate such that the yarns were aligned in parallel and were single layered. There were approximately 12 yarns per inch width. The yarns were then completely coated with a vinyl plastisol. The plastisol-coated yarn sample was then pressed between plates at 320° F./3,000 psi for 3 minutes and then was cooled. The resulting sheet was transparent with the yarns being only faintly visible. The sheet was then embossed with a tile grout line embossing plate at 220° F./800 psi for 10 seconds. The embossing plate was then removed and the sample was pressed flat, using the same conditions with which it was embossed, and cooled. The resulting sheet was transparent except in those areas which were embossed. The embossed areas displayed directional flip.

EXAMPLE 3

A multi-filament glass yarn was applied to a 9″×9″ metal plate in the same manner as in Example 2. A solvent based polyurethane binder was applied to the yarns so that the yarns were completely covered with the binder. The solvent was allowed to evaporate and the sample was then pressed at 350° F./750 psi for 3 minutes and then cooled to produce a flat sheet, which was basically transparent with the yarns being only faintly visible. The sheet was embossed with a tile grout line embossing plate at 250° F./300 psi for 20 seconds and then cooled. The sheet was transparent except in the embossed areas which displayed three dimensionality and directional flip.

What is claimed is:

1. A process for producing an article suitable for use as a decorative surface covering, said process comprising:

(a) embedding, in a unidirectional orientation, a plurality of translucent solid fibers in a translucent binder;

(b) curing the binder; and (c) subjecting the cured binder to pressure which is applied in such a manner to create aligned tubular air pockets adjacent to the surface of the fibers.

2. The process of claim 1 comprising the additional step of applying a decorative pattern to a surface of the article.

3. The process of claim 2 wherein the decorative pattern is applied to the outer surface of the article.

4. The process of claim 3 wherein a transparent protective layer is applied on top of the decorative pattern.

5. The process of claim 1 wherein the fibers are comprised of polyamide.

6. The process of claim 1 wherein the binder is plasticized polyvinyl chloride.

7. The process of claim 1 wherein the pressure is applied perpendicular to the horizontal axis of the fibers.

8. The process of claim 7 wherein the pressure is applied to only selected areas of the binder to thereby create aligned tubular air pockets adjacent to the surface of those fibers that are directly beneath the area where the pressure is applied.

9. A surface covering article suitable for use as a floor covering which comprises a flexible solid translucent binder having an inner and outer surface, said binder having intimately associated therewith a plurality of translucent, solid fibers that are aligned in a unidirectional orientation wherein at least some of the fibers have adjacent to their surface aligned tubular air pockets.

10. The surface covering article of claim 9 which further comprises a decorative pattern which is positioned on a surface of said substrate.

11. The surface covering article of claim 9 wherein the decorative pattern is positioned on the outer surface of the said substrate.

12. The article of claim 9 further comprising a protective layer positioned on top of the decorative pattern.

13. The article of claim 12 wherein the fibers are comprised of polyamide.

* * * * *